United States Patent [19]

Yamada et al.

[11] Patent Number: 4,980,788
[45] Date of Patent: Dec. 25, 1990

[54] THIN-FILM-TYPE MAGNETIC HEAD DEVICE

[75] Inventors: Masamichi Yamada; Katsuo Konishi, both of Yokohama; Michiyori Miura, Chigasaki, all of Japan

[73] Assignee: Hitachi, Ltd., Tokyo, Japan

[21] Appl. No.: 293,506

[22] Filed: Jan. 4, 1989

[30] Foreign Application Priority Data

Jan. 13, 1988 [JP] Japan .................................. 63-3798

[51] Int. Cl.$^5$ ............................................. G11B 5/31
[52] U.S. Cl. .................................................. 360/126
[58] Field of Search ........................................ 360/126

[56] References Cited

U.S. PATENT DOCUMENTS 4,719,527 1/1988 Yoshisato et al. .................. 360/126

FOREIGN PATENT DOCUMENTS 60-45913 3/1985 Japan .
60-45914 3/1985 Japan .

*Primary Examiner*—Robert S. Tupper
*Attorney, Agent, or Firm*—Antonelli, Terry, Stout & Kraus

[57] ABSTRACT

A thin-film-type magnetic head device for magnetically recording and/or reproducing signals in and from a magnetic recording medium has a lower magnetic layer, an insulating layer, a thin-film-type coil and an upper magnetic layer which are formed sequentially on a substrate such that a magnetic circuit is formed by the upper and lower magnetic layers. The upper and lower magnetic layers partially abut each other to provide a magnetic coupling therebetween. At least one slit formed in the region where the upper and lower magnetic layers abut each other, so as to suppress generation of eddy currents in the magnetic layers in the region.

16 Claims, 3 Drawing Sheets

THIN-FILM-TYPE MAGNETIC HEAD DEVICE

BACKGROUND OF THE INVENTION

1. Field of the Invention

The present invention relates to a thin-film-type magnetic head device suitable for use in recording and reproduction of high-frequency signals.

2. Description of the Related Art

FIG. 1 shows a typical known thin-film-type magnetic head device. This known magnetic head device has a substrate 6, a lower magnetic layer 2 carried by the substrate 6, and an upper magnetic layer 1 superposed on the lower magnetic layer 2 through the intermediary of an insulating layer 7a. The clearance between the upper and lower magnetic layers 1 and 2 is reduced to form a small magnetic gap 10 at the leading side (right upper side as viewed in FIG. 1) as viewed in the direction of movement of a magnetic tape. As shown in FIG. 2 which is a top plan view of the magnetic head device of FIG. 1, a through-hole (referred to as "rear core through-hole" hereinafter) 9 is formed in the trailing side of the insulating layer 7a such that the lower magnetic layer 2 and the upper magnetic layer 1 are made to abut each other through the rear core through-hole 9. In consequence, a closed loop of the magnetic path is formed to include the upper magnetic layer 1, the abutting surfaces 4 of the upper and lower magnetic layers 1 and 2 at the region of the rear core through-hole 9, the lower magnetic layer 2 and the magnetic gap 10. In this known thin-film-type magnetic head, a membrane coil 3 is wound such that a portion of this coil penetrates the insulating layer 7a.

In order to improve the magnetic efficiency in this known thin-film-type magnetic head, it has been proposed to reduce the magnetic resistance in the region where the rear core through-hole 9 exists, as disclosed in, for example, Japanese Patent Unexamined Publication Nos. 60-45913 and 60-45914.

In recording operation of the magnetic head device, a recording electric current is supplied to the thin-film coil 3 so that a magnetic flux is generated to flow through the upper magnetic layer 1 and the lower magnetic layer 2 passing through a recording medium thereby recording signals corresponding to the recording current. In reproducing the recorded information, magnetic flux is formed through the upper and lower magnetic layers 1 and 2 as the tape runs in sliding contact with the lower magnetic layer 2 in the region where the magnetic gap 10 exists. The greater the amount of the the magnetic flux, the higher the recording and reproduction efficiencies. A greater amount of magnetic flux can be obtained by increasing the thicknesses of the upper and lower magnetic layers 1 and 2 so as to increase the cross-sectional area of the head perpendicular to the direction of the magnetic flux thereby decreasing the magnetic resistance in the path of magnetism.

Generally, however, the upper magnetic layer 1, lower magnetic layer 2 and the insulating layer 7a are formed by, for example, sputtering. Therefore, the portion of the upper magnetic layer above the insulating layer 7a and the lower magnetic layer 2 can be obtained in flat forms of predetermined thicknesses without substantial difficulty, but the thickness of the upper magnetic layer 1 is undesirably reduced at the region in which the rear core through-hole exists where the surface is tapered. In addition, the upper magnetic layer 1 is depressed in the region where the rear core through-hole 9 exists, so that the magnetic flux is concentrated to the portions of the upper magnetic layer 1 constituting the wall of the through-hole 9 where the thickness of the upper magnetic layer is small. This portion of the upper magnetic layer having the reduced thickness poses a greater magnetic resistance than other portions, thus decreasing the magnetic efficiency of the thin-film-type magnetic head.

In the thin-film-type magnetic head device disclosed in Japanese Patent Unexamined Publication No. 60-45913, the rear core through-holes are provided in plural, whereas, in the thin-film-type magnetic head device disclosed in Japanese Patent Unexamined Publication No. 60-45914, the rear core through-hole has a profile composed of convexities and concavities. These measures are intended for increasing the peripheral length of the rear core through-hole so as to increase the cross-sectional area of the upper magnetic layer in the region where the upper magnetic material exists, thereby to reduce the magnetic resistance in this region.

In these known thin-film-type magnetic head devices, no substantial problem is caused in regard to the magnetic efficiency when the frequency of the signal to be recorded or reproduced is low, unless the thicknesses of the magnetic layers constituting the path of magnetism are reduced. However, when the signal frequency is increased, a serious reduction is caused in the efficiency due to loss of energy attributable to generation of eddy currents.

A discussion will be made as to the loss of energy due to generation of eddy currents. Attention is drawn to the upper flat portion of the upper magnetic layer 1 in which the magnetic flux runs in parallel to the surface of the upper magnetic layer. The magnetic flux is allowed to flow only through a core region which is spaced by a depth δ from both surfaces of the upper magnetic layer 1 having a thickness t as shown in FIG. 3A, due to generation of eddy currents. The depth δ is represented by the following formula:

$$\delta = \sqrt{\frac{\rho}{2\pi f \mu}} \tag{1}$$

where ρ represents the specific resistivity of the magnetic layers 1, 2, f represents the signal frequency and μ represents the magnetic permeability of the magnetic layers 1, 2.

The loss due to generation of eddy currents, therefore, can be eliminated by adopting a laminated magnetic layer in which a magnetic layer having a thickness of 2δ and an insulating layer are superposed alternatingly to form a laminated structure.

A problem still remains unsolved even when the upper and lower magnetic layers are constructed as laminated layers. Namely, in the region where the rear core through-hole 9 exists, the magnetic flux flows in the thicknesswise direction of the magnetic films 1 and 2 so that eddy currents are generated in the film surfaces of the magnetic layers 1 and 2 so as to restrict the path of the magnetic flux to the area under the depth of δ given by the formula (1) from the wall surface of the rear core through-hole 9 as shown in FIG. 3B. Thus, the magnetic flux is allowed to pass only through the regions corresponding to the hatched area 8 in FIGS. 1 and 2.

Thus, the known thin-film-type magnetic head device cannot avoid energy loss due to generation of eddy currents in the region where the rear core through-hole exists, with the result that the recording and reproduction performance is lowered particularly when the signal frequency is high.

SUMMARY OF THE INVENTION

Accordingly, an object of the present invention is to provide a thin-film-type magnetic head device having improved recording and reproducing performance at high signal frequency, thereby overcoming the above-described problems of the prior art.

To this end, according to the present invention, there is provided a thin-film-type magnetic head device having a slit formed to extend through an upper magnetic layer and a lower magnetic layer perpendicularly to the abutting surfaces of these layers in the region of the magnetic head where a rear core through-hole is provided.

In the region of the magnetic head where the rear core through-hole is provided, the magnetic flux runs in the thicknesswise direction of the upper and lower magnetic layers, with the results that eddy currents are generated to flow in a plane parallel to the planes of these layers. According to the invention, however, the eddy currents are partially interrupted due to the presence of the slits so that the loss attributable to the generation of eddy currents is decreased thereby increasing the amount of magnetic flux flowing through the rear core through-hole.

In consequence, in the magnetic head device of the present invention, loss of energy due to generation of eddy currents is remarkably reduced in the region where a rear core through-hole exists and where the upper and lower magnetic layers abut each other, whereby a remarkable improvement is achieved in the recording and reproducing performance particularly when the recording or reproduced signal frequency is high.

The above and other objects, features and advantages of the present invention will become clear from the following description of the preferred embodiments when the same is read in conjunction with the accompanying drawings.

DESCRIPTION OF THE PREFERRED EMBODIMENT

Figure 1:
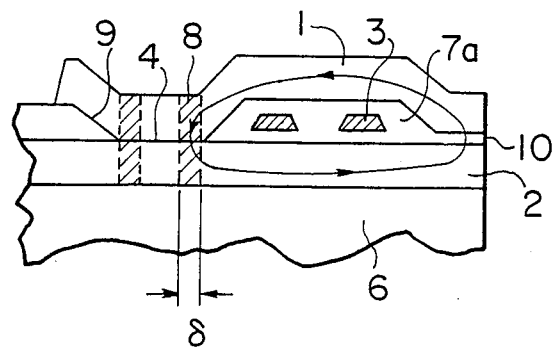
FIG. 1 is a longitudinal sectional view of a known thin-film-type magnetic head device.

A preferred embodiment of the thin-film-type magnetic head device in accordance with the present invention will be described with reference to FIG. 4 which is a plan view of the magnetic head device and also to FIG. 5 which is a sectional view taken along the line V—V of FIG. 4. In these figures, the same reference numerals are used to denote the same parts or members as those used in FIGS. 1 and 2. Numerals 7b and 11 denote, respectively, an insulating layer and a tape sliding surface.

Figure 4:
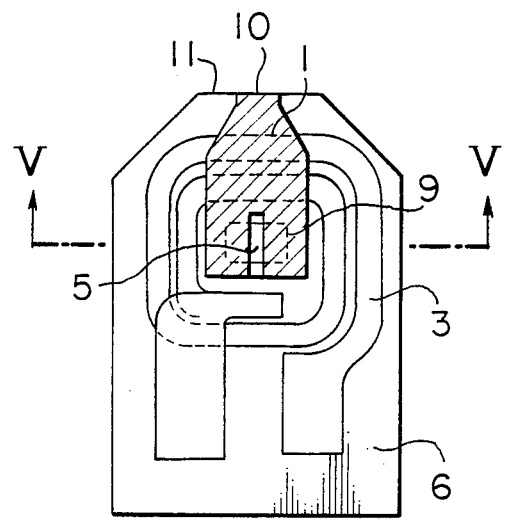
FIG. 4 is a plan view of an embodiment of the thin-film-type magnetic head device in accordance with the present invention.
Figure 5:
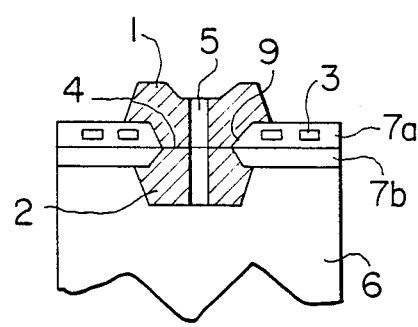
FIG. 5 is a sectional view taken along the line V—V of FIG. 4.

Referring to FIG. 4, a substrate 6 is made from a material such as a glass, ceramics or ferrite. As will be seen from FIG. 5, a groove is formed in the substrate 6, and the groove is filled with a soft magnetic layer 2 made of a material such as sendust, an amorphous alloy or the like. This arrangement, however, is not exclusive and the arrangement may be such that the substrate 6 also serves as a lower magnetic layer 2. In such a case, the substrate 6 is made of a magnetic material. However, when the separate lower magnetic layer 2 is used as illustrated, the substrate 6 is made from a non-magnetic material. Insulating layers 7b and 7a made of, for example, $SiO_2$ or $Al_2O_3$ are formed on the lower magnetic layer 2, and an upper magnetic layer 1 of the same material as the lower magnetic layer 2 is superposed to the insulating layer 7a. The insulating layers 7b and 7a are intended for forming a large gap between the upper magnetic layer 1 and the lower magnetic layer 2 so as to magnetically isolate the upper and lower magnetic layers 1 and 2 from each other, and for electrically insulating a membrane coil 3 from the upper magnetic layer 1 and the lower magnetic layer 2, the membrane coil 3 being provided on the substrate 6 such that a portion thereof being wound through a gap between the upper magnetic layer 1 and the lower magnetic layer 2.

Figure 2:
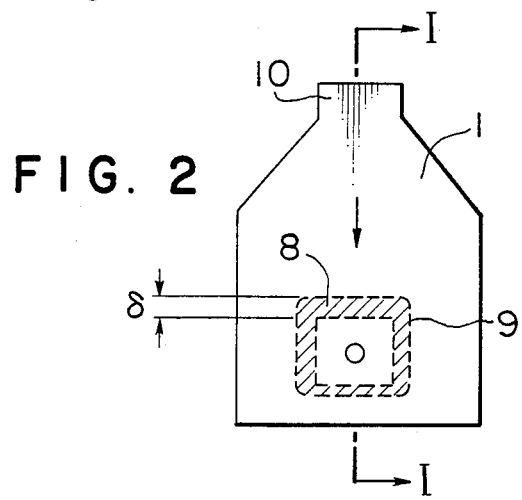
FIG. 2 is a top plan view of the thin-film-type magnetic head device shown in FIG. 1.

As in the case of the known thin-film-type magnetic head shown in FIG. 1, the thicknesses of the insulating layers 7a and 7b are largely decreased at the leading side of the magnetic head as viewed in the direction of movement of the tape so as to form a magnetic gap 10 in which the upper magnetic layer 1 and the lower magnetic layer 2 are positioned very close to each other. At the same time, a rear core through-hole 9 is formed in the rear portion of the insulating layers 7a, 7b so that the upper and lower magnetic layers 1 and 2 abut each other through the rear core through-hole 9, whereby a magnetic path is formed to include the upper magnetic layer 1, abutting surface 4, lower magnetic layer 2 and the magnetic gap 10.

The illustrated embodiment of the thin-film-type magnetic head device of the present invention has a slit 5 formed in the rear portion of the upper and lower magnetic layers 2 where the rear core through-hole 9 is provided. The slit 5 extends in the direction perpendicular to the tape sliding surface 11 across the rear core through-hole 9 and is formed so as to penetrate the upper and lower magnetic layers 1 and 2 perpendicularly to the abutting surface 4 of the upper and lower magnetic layers 1 and 2. The width of the slit 5 is so determined as small as possible but large enough to electrically isolate two portions of each of the upper and lower magnetic layers 1 and 2 separated from each other by the slit 5. The slit 5 is formed by, for example, ion etching.

Figure 3A:
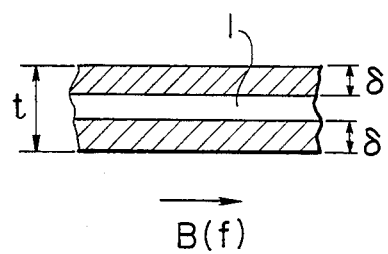
FIGS. 3A and 3B are illustrations of effective magnetic path region in the magnetic layers used in the thin-film-type magnetic head device shown in FIGS. 1 and 2.
Figure 3B:
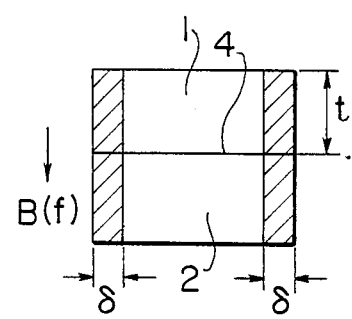

As explained before, in the region where the rear core through-hole 9 is provided, the magnetic flux flows in the thicknesswise direction of the upper and lower magnetic layers 1 and 2 so that eddy currents are generated in a plane parallel to the planes of the magnetic layers 1 and 2. In the illustrated embodiment, however, the plane in which the eddy currents flow is cut by the slit 5 so that the eddy currents are partially interrupted. As explained before in connection with FIG. 3(B), in the known magnetic head device, the path of the magnetic flux is restricted to the core region which is at the depth of δ of formula (1) from both surfaces. In contrast, in the illustrated embodiment, the magnetic flux is allowed to flow only through a surface region of depth smaller than δ from the surface defining the slit 5, whereby the amount of magnetic flux is increased thereby improving the recording and reproducing characteristics in the high-frequency region.

Figure 6:
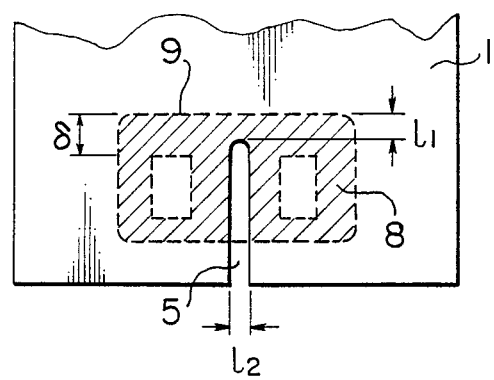
FIGS. 6 to 8 are plan views of different examples of slits formed in the thin-film-type magnetic head device in accordance with the present invention.

FIG. 6 is a plan view illustrating another example of the slit which can be used in the thin-film-type magnetic head in accordance with the present invention. In this example, the slit 5 terminates at a position which is spaced by a distance $l_1$ from one side of the rear core through-hole 9. The distance $l_1$ is determined to be slightly smaller than the aforementioned depth δ. The hatched area 8 is the region where the magnetic flux flows, i.e., the effective magnetic path region. It will be seen that the amount of the magnetic flux is further increased as compared with the arrangement of FIG. 4. A symbol $l_2$ represents the width of the slit 5.

Figure 7:
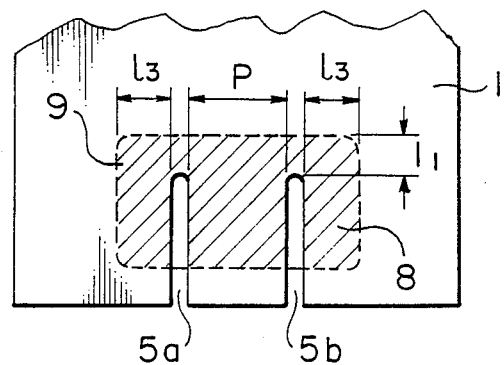

FIG. 7 is a plan view showing still another example of the slit used in the thin-film-type magnetic head device of the present invention. In this case, a pair of slits 5a and 5b are formed to extend in parallel with each other. The distance P between two slits 5a and 5b is determined to be smaller than twice of the depth δ determined by the formula (1). At the same time, the distance $l_3$ between the sides of the slits 5a, 5b and the adjacent sides of the rear core through-hole 9 is determined to be smaller than the depth δ. In addition, the distance $l_1$ between the ends of the slits 5a, 5b and the adjacent side of the rear core through-hole 9 is determined to be slightly smaller than the depth δ, as is the case of the embodiment shown in FIG. 6. Thus, the whole area of the rear core through-hole 9 except the slits 5a and 5b is usable as the magnetic flux effective region 8.

Figure 8:
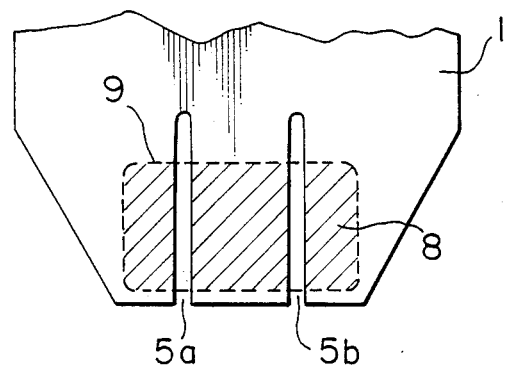

FIG. 8 is a plan view showing a still further example of the slit usable in the thin-film-type magnetic head device of the present invention. In this case, a pair of slits 5a and 5b are formed so as to extend across the rear core through-hole 9. The distance between the slits 5a and 5b and the distances between the slits 5a, 5b and the sides of the rear core through-hole 9 are determined in the same manner as those in the arrangement shown in FIG. 7. Thus, the whole area of the rear core through-hole 9 is usable as the magnetic flux effective region 8. The arrangement shown in FIG. 8 is further characterized in that the left and right corner portions and the trailing end portion of the upper magnetic layer 2 are removed so as to further decrease loss of energy attributable to generation of eddy currents.

Although the described embodiment and modifications employ one or two slits, this arrangement is only illustrative and the invention does not exclude the use of three or more slits. The slit or slits may be provided in the region of the rear core through-hole and the direction in which the slit or slits extend may be selected as desired provided that they are parallel to one side of the rear core through-hole. It is also possible to form the slit with a curvature in conformity with the profile of the rear core through-hole. Each of the upper magnetic layer and the lower magnetic layer may be composed of a single layer or may have a laminated structure.

What is claimed is:

1. A thin-film-type magnetic head device comprising a substrate and a laminated structure disposed on said substrate, said laminated structure having a plurality of thin-film-type layers including a lower magnetic layer, an insulating layer, a coil and an upper magnetic layer, said insulating layer being arranged so as to surround said coil, said upper and lower magnetic layers delimiting a path of magnetic flux for enabling recording information on and/or reproducing information from a magnetic recording medium, said insulating layer being disposed between said lower magnetic layer and said upper magnetic layer at a leading end portion of said magnetic head device so as to provide a magnetic gap adjacent to said magnetic recording medium; a trailing end portion of said magnetic head device having a rear core through-hole provided in said insulating layer so as to enable said lower magnetic layer and said upper magnetic layer to abut each other; and at least one slit extending through abutting surfaces of said lower and upper magnetic layers in the region where said rear core through-hole is provided so as to interrupt eddy currents in said lower and upper magnetic layers.

2. A thin-film-type magnetic head device according to claim 1, wherein said at least one slit extends through said lower and upper magnetic layers perpendicularly to said leading end portion of said magnetic head device.

3. A thin-film-type magnetic head device according to claim 1, wherein a plurality of slits are provided and extend parallel to one another.

4. A thin-film-type magnetic head device according to claim 3, wherein the distance between an edge of said rear core through-hole and a slit of said plurality of slits which is adjacent to said edge is less than a depth δ of surface regions of said lower and upper magnetic layers within which said magnetic flux is confined by said eddy currents, and wherein the distance between slits of said plurality of slits which are adjacent to each other is less than twice said depth δ.

5. A thin-film-type magnetic head device according to claim 4, wherein said depth δn is defined by the following formula:

$$\delta = \sqrt{\frac{\rho}{2\pi f \mu}}$$

wherein ρ is the specific resistivity of said lower and upper magnetic layers, f is the frequency of a signal represented by said magnetic flux, and μ is the magnetic permeability of said lower and upper magnetic layers.

6. A thin-film-type magnetic head device according to claim 4, where each slit of said plurality of slits terminates at a respective point within said rear core through-hole which is less than said depth δ from an edge of said rear core through-hole.

7. A thin-film-type magnetic head device according to claim 4, wherein each slit of said plurality of slits terminates at a respective point outside of said rear core through-hole.

8. A thin-film-type magnetic head device according to claim 1, wherein one slit is provided, and wherein the distance between said slit and edges of said rear core through-hole which are adjacent to said slit is less than a depth δ of surface regions of said lower and upper magnetic layers within which said magnetic flux is confined by said eddy currents.

9. A thin-film-type magnetic head device according to claim 8, wherein said depth δ is defined by the following formula:

$$\delta = \sqrt{\frac{\rho}{2\pi f \mu}}$$

wherein $\rho$ is the specific resistivity of said lower and upper magnetic layers, f is the frequency of a signal represented by said magnetic flux, and $\mu$ is the magnetic permeability of said lower and upper magnetic layers.

10. A thin-film-type magnetic head device according to claim 8, wherein said slit terminates at a point within said rear core through-hole which is less than said depth δ from an edge of said rear core through-hole.

11. A thin-film-type magnetic head device according to claim 1, wherein said eddy currents are generated by said magnetic flux.

12. A thin-film-type magnetic head device according to claim 1, wherein said at least one slit terminates at a point which is located within the area of said rear core through-hole.

13. A thin-film-type magnetic head device according to claim 12, wherein the distance between said point and an edge of said rear core through-hole is less than a depth δ of surface regions of said lower and upper magnetic layers within which said magnetic flux is confined by said eddy currents.

14. A thin-film-type magnetic head device according to claim 13, wherein said depth δ is defined by the following formula:

$$\delta = \sqrt{\frac{\rho}{2\pi f \mu}}$$

wherein $\rho$ is the specific resistivity of said lower and upper magnetic layers, f is the frequency of a signal represented by said magnetic flux, and $\mu$ is the magnetic permeability of said lower and upper magnetic layers.

15. A thin-film-type magnetic head device comprising a lower magnetic layer, an insulating layer, a thin-film-type coil and an upper magnetic layer, said insulating layer being arranged so as to surround said coil, said layers being disposed on a substrate so as to enable said upper and lower magnetic layers to form a magnetic circuit and to partially abut each other to provide a magnetic coupling therebetween, wherein at least one slit is provided in said upper and lower magnetic layers in a region where said upper and lower magnetic layers abut each other so as to suppress generation of eddy currents in said upper and lower magnetic layers in said region.

16. A thin-film-type magnetic head device according to claim 15, wherein said eddy currents are generated by magnetic flux in said magnetic circuit.

* * * * *